United States Patent [19]

Neely, Jr.

[11] 3,754,388

[45] Aug. 28, 1973

[54] HAY STACK FORMING APPARATUS

[76] Inventor: Allan B. Neely, Jr., 14889 E. 25th, Aurora, Colo. 80010

[22] Filed: Sept. 13, 1972

[21] Appl. No.: 288,564

[52] U.S. Cl. .................................. 56/346, 214/522
[51] Int. Cl. ............................................. A01d 43/02
[58] Field of Search ............................. 56/344–353, 364; 214/518–522, 501

[56] References Cited
UNITED STATES PATENTS

| | | | |
|---|---|---|---|
| 2,496,876 | 2/1950 | Kayser | 214/520 X |
| 2,648,945 | 8/1953 | Harrington | 56/346 |
| 3,110,148 | 11/1963 | Mader et al. | 56/347 |
| 3,511,399 | 5/1970 | Sammarco | 214/520 |
| 3,556,327 | 1/1971 | Garrison | 214/522 |
| 3,691,741 | 9/1972 | White et al. | 56/344 |

FOREIGN PATENTS OR APPLICATIONS

| | | | |
|---|---|---|---|
| 1,582,459 | 11/1967 | Germany | 56/364 |

*Primary Examiner*—Russell R. Kinsey
*Attorney*—Frank C. Lowe

[57] ABSTRACT

An apparatus to pick up loose hay in a field and to form the same into a compacted hay stack. Thereafter, the hay stack may be discharged from the apparatus. The apparatus, which may be upon a trailer, is provided with pickup and lifting components affixed to a forward section thereof. A walled, stack chamber is formed upon a rear section of the trailer so that loose hay picked up and lifted by the aforementioned components of the forward section will drop into the chamber. Conveyors form the floor of this chamber to move the hay out of the chamber and a float having reciprocating shifting bars in a horizontally disposed arrangement will ride upon the hay stack being formed in the chamber to shift and to distribute the hay to the rearward section of the apparatus. Discharge of a stack within this chamber is effected by opening gates at the rear end thereof.

10 Claims, 16 Drawing Figures

Patented Aug. 28, 1973

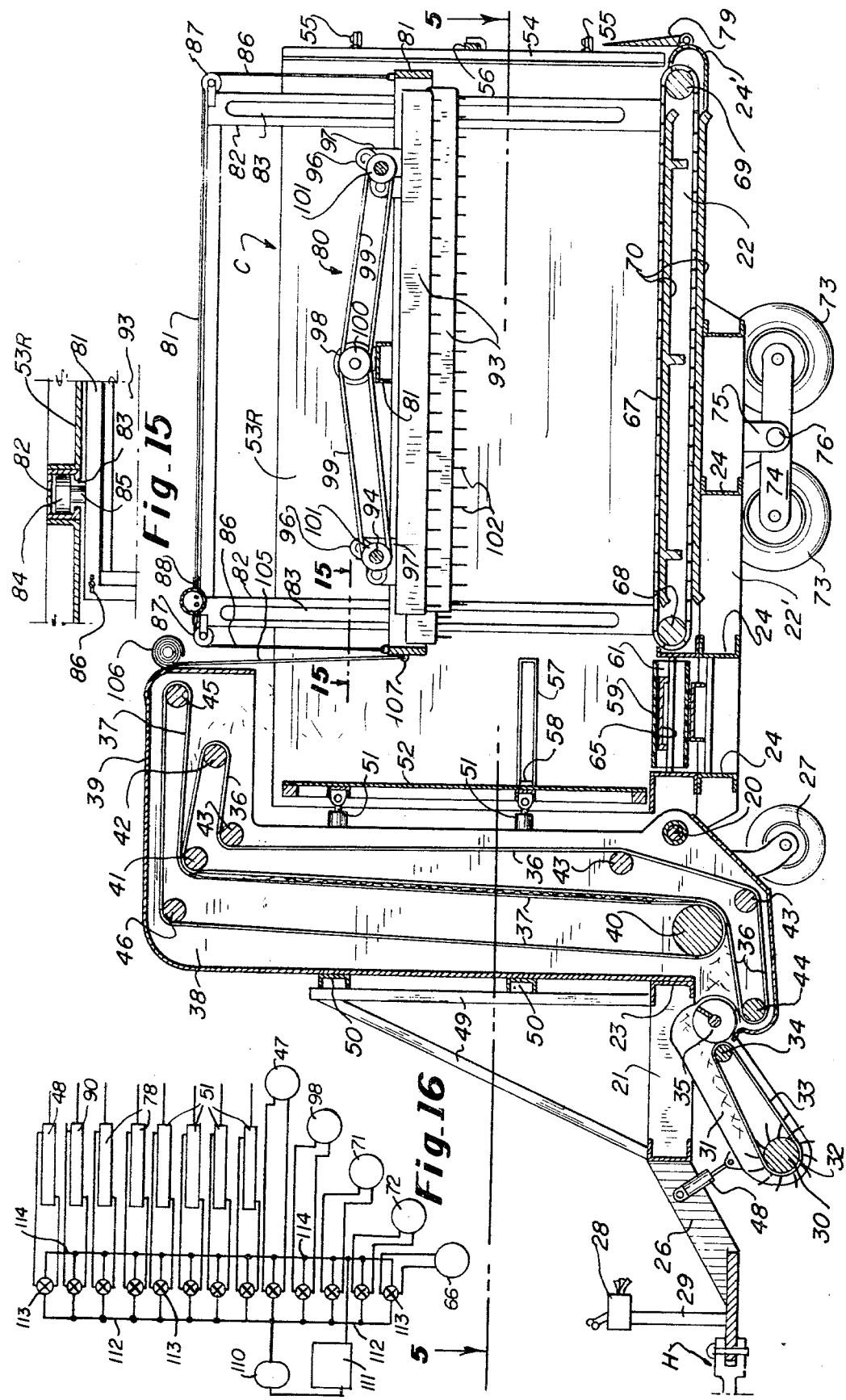

Patented Aug. 28, 1973
3,754,388
4 Sheets-Sheet 3
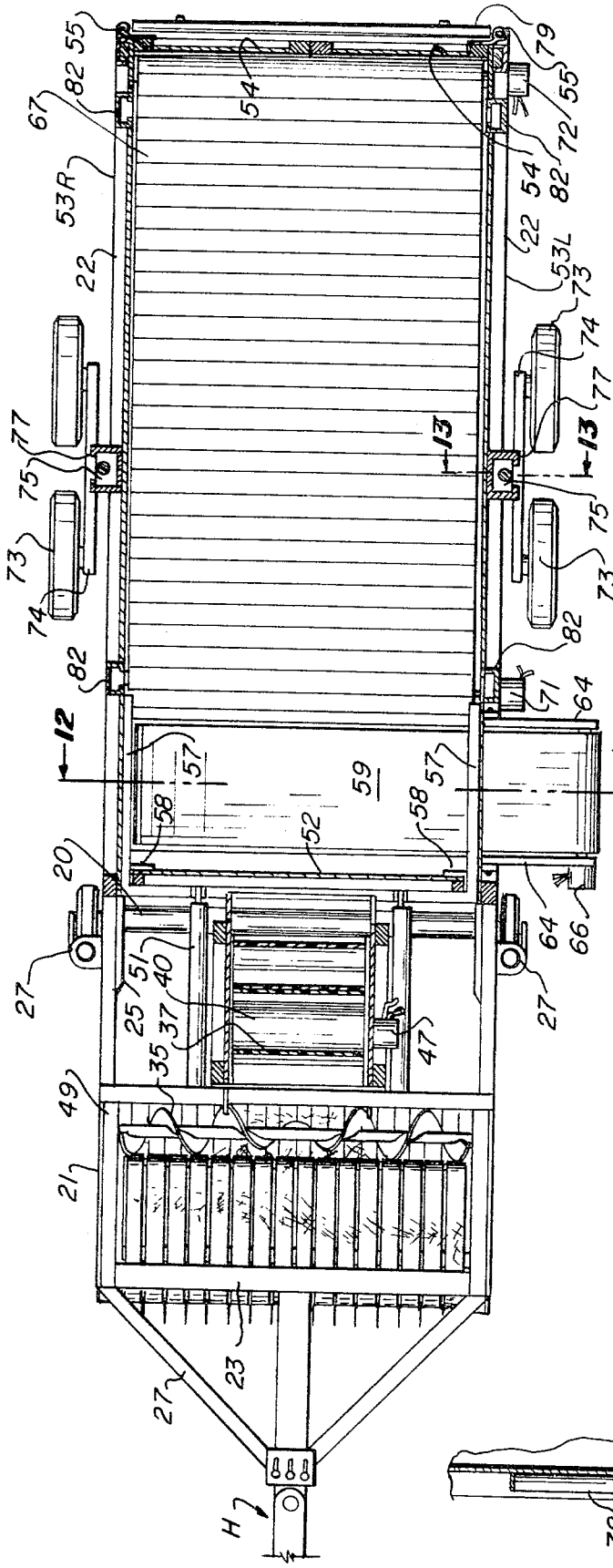
Fig_5
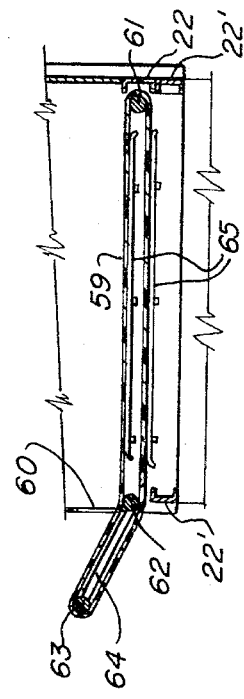
Fig_12
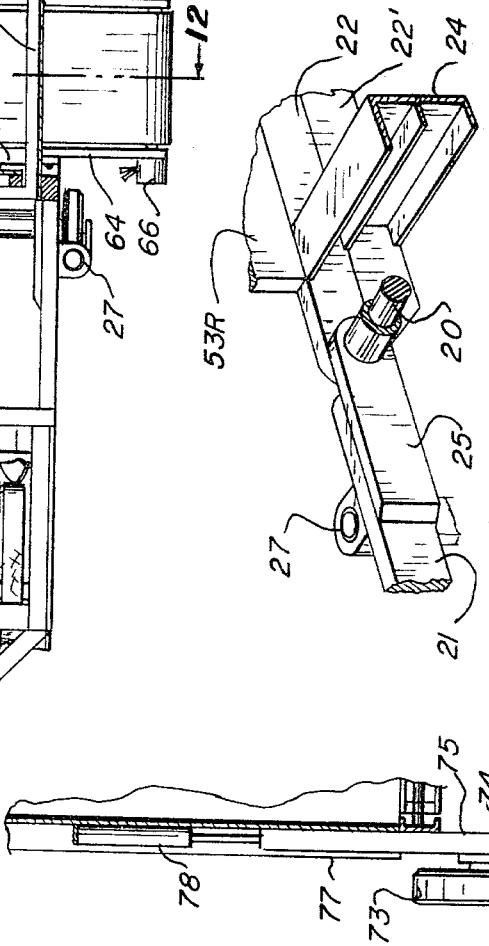
Fig_14
Fig_13

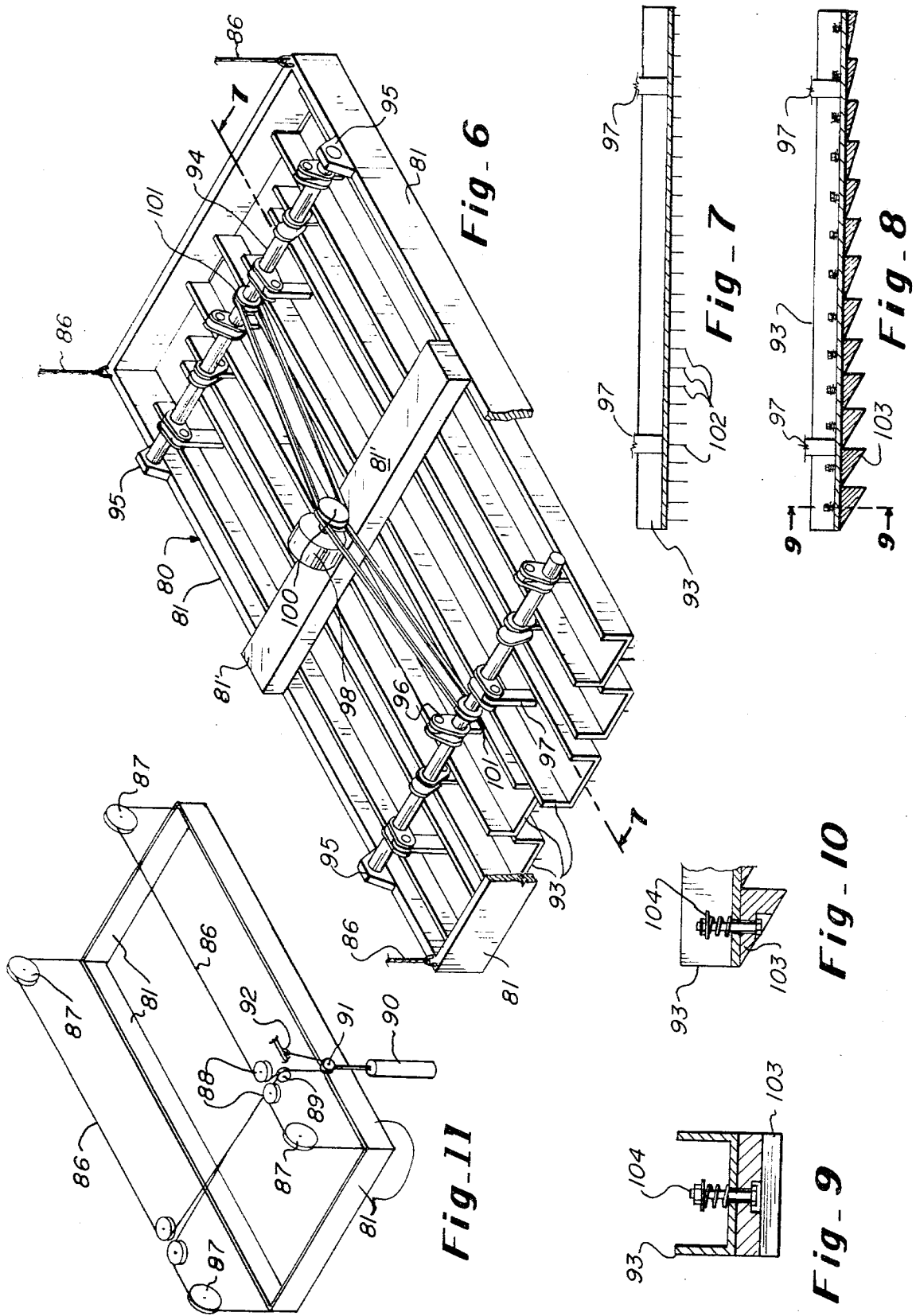

HAY STACK FORMING APPARATUS

This invention relates to apparatus for forming hay stacks, and more particularly to an apparatus which will pick up loose hay in a field, shuffle and compact this hay into a stack and thereafter, discharge the completed stack. As such, the invention will be hereinafter called a hay stack forming apparatus.

An object of the invention is to provide a novel and improved hay stack forming apparatus which is a mobile unit capable of moving or being moved over a field to collect cut hay and form a stack within the apparatus and thereafter, capable of being transported from the field to discharge the hay stack at any selected location.

Another object of the invention is to provide a novel and improved hay stack forming apparatus which will pick up loose hay from a field, compact the same into a stack within the apparatus and thereafter discharge the entire stack from the apparatus, or in the alternative, discharge a flow of the hay from a side chute as into feeder troughs or the like.

Another object of the invention is to provide a novel and improved hay stack forming apparatus which will more effectively compact loose hay into a stack as it is fed into the apparatus.

Another object of the invention is to provide a novel and improved hay stack forming apparatus which is capable of picking up loose hay in a field, compacting the same into a stack within the apparatus and thereafter discharging the same from the apparatus, and which is also capable of picking up and transporting a hay stack of comparable size.

Other objects of the invention are to provide a novel and improved hay stack forming apparatus which is a neat appearing, simple, versatile, easily operated, reliable, rugged and durable unit.

With the foregoing and other objects in view, all of which more fully hereinafter appear, my invention comprises certain constructions, combinations and arrangements of parts and elements as hereinafter described, defined in the appended claims and illustrated in a preferred embodiment in the accompanying drawing, in which:

FIG. 4 is a longitudinal sectional view as taken from the indicated line 4—4 at FIG. 1, but on an enlarged scale.

FIG. 5 is a sectional plan view as taken from the indicated line 5—5 at FIG. 4.

FIG. 6 is an overhead isometric view of a stack compacting unit which is suspended within the rear section of the unit, as taken substantially from the indicated arrow 6 at FIG. 1, but with portions of the frame thereof broken away to show parts otherwise hidden from view.

FIG. 7 is a longitudinal sectional view of one of the hay gripping members of the stack compacting unit, as taken from the indicated line 7—7 at FIG. 6.

FIG. 8 is a longitudinal sectional view similar to FIG. 7, but showing an alternate construction of a hay gripping member of the stack compacting component.

FIG. 9 is a transverse sectional detail as taken from the indicated line 9—9 at FIG. 8, but on an enlarged scale.

FIG. 10 is a fragmentary sectional detail similar to a portion of the showing at FIG. 8, but on an enlarged scale and with the teeth of the hay gripping members being reversed.

FIG. 11 is a diagrammatic, isometric view of the suspension system per se, for supporting and raising and lowering the stack compacting unit shown at FIG. 6.

FIG. 12 is a transverse sectional view of a lower portion of the apparatus as taken from the indicated line 12—12 at FIG. 4.

FIG. 13 is a fragmentary sectional detail as taken from the indicated line 13—13 at FIG. 5, but on an enlarged scale.

FIG. 14 is a fragmentary perspective view of certain framework members of the apparatus at the tipping axis of the unit.

FIG. 15 is a fragmentary sectional detail as taken from the indicated line 15—15 at FIG. 4, but on an enlarged scale.

FIG. 16 is a diagram of the hydraulic lines of the apparatus.

Figure 1:
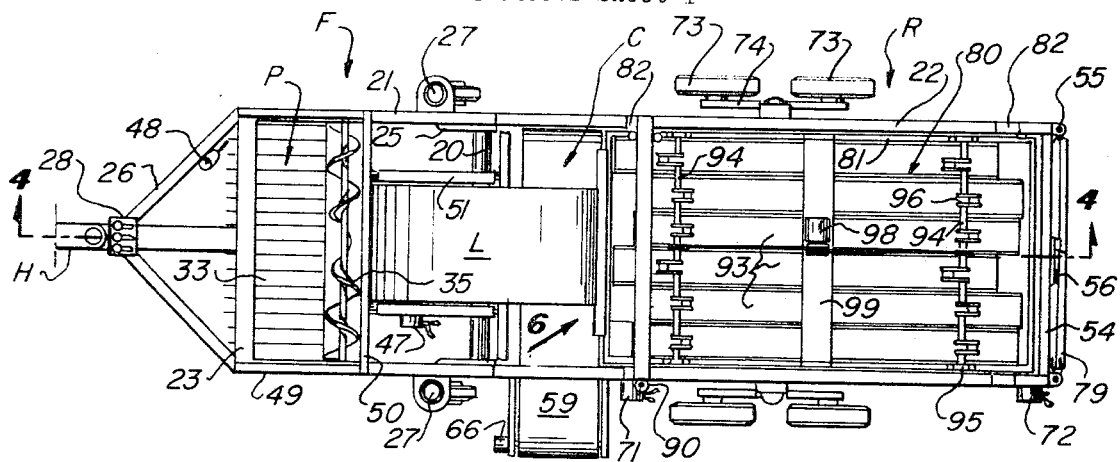
FIG. 1 is a plan view of a haystack forming apparatus constructed according to the principles of the present invention.

Many farmers prefer to handle the hay in their fields as loose hay, to be piled in stacks rather than being baled, since baling equipment and time consuming handling operations are eliminated. However, when hay is handled as loose hay, other problems are encountered such as the picking up of the hay from the field or from windrows and transporting the loose hay to a central location to pile it into a stack. The transportation and movement of large stacks of loose hay poses other problems and it has been recognized that if such problems involving transportation of a hay stack could be solved, a great deal of hay which is now being baled could be advantageously handled as stacks of loose hay.

A recent development is alfalfa prepared as a high protein food for both animal and human consumption. It is necessary to cut the alfalfa at a proper stage of maturity and promptly process this cut alfalfa before enzymes can act to change the substances within the plants. Time being of the essence, it is desirable to provide apparatus which will pick up loose hay as it is cut and as soon as a stack, or load, is collected, to immediately transport the hay to a processing plant.

The present invention was conceived and developed with such considerations in view and this invention comprises, in essence, a vehicle having a hay stack chamber which can be towed by a tractor. This unit includes apparatus for picking up hay from a field and depositing this loose hay into the forepart of a stack chamber behind the pickup apparatus. The hay is then compacted in this chamber and the stack formed therein may be subsequently discharged from the chamber at any desired location. As will hereinafter appear in detail, the mechanisms for picking up the hay and moving it to the chamber and for thereafter shifting and compacting this hay into a stack will function to orient the hay stems in a random, interlocking manner such that a tight, compact stack is produced which, in a sense, forms an oversized bale. Such a bale-like stack may be easily handled when unloading from the apparatus and also, when reloading the same into the apparatus if necessary, all as will be more apparent from the following description of a preferred embodiment of the invention.

Referring more particularly to the drawing, the hay stack forming apparatus depicted therein is a mobile, trailer-like unit which is adapted to be towed by a tractor. A tractor is not shown, but a tractor hitch H is shown to indicate the connection of the unit with a tractor. It is also contemplated that this unit could be self-propelled in any suitable manner, not shown, without significantly changing the inventive concept set forth herein.

The haystack forming apparatus is carried upon a wheel-mounted, articulated framework. As such, the apparatus consists of the forward section F and a rearward section R, and these sections are joined together by a transverse pivot bar 20 which extends across the unit to interconnect a pair of longitudinal side frame members 21 of the forward section thereof with a corresponding pair of longitudinal side frame members 22 of the rearward section thereof. Thus, the articulation at this pivot point will permit the rear end of the rearward section R to drop as hereinafter described. The frame members 21 of the forward section are held apart in spaced parallelism by transverse cross frame members 23 and the frame members 22 of the rear section are held apart in spaced parallelism by like transverse cross frame members 24. The longitudinal frame members 21 and 22, and the cross frame members 23 and 24 are conventional structural beams, such as channels, which are welded together or otherwise fabricated in any conventional manner. Also, the longitudinal frame members 22 of the rearward section are reinforced and widened at the central section of the unit by supplementary frame members 22' which are abutted against the underside of the members 22 to provide for an opening to accommodate a conveyor belt as hereinafter described. In the unit illustrated, the frame members 21 and 22, at each side of the unit, are longitudinally aligned and the pivotal connection at the transverse pivot bar 20 is effected by an offset, rearwardly extended lug 25 at the inner face of each forward frame member 21. The pivot bar 20 extends through each lug to connect with the adjacent front end of the rear frame member 22, as best illustrated at FIG. 14.

A tractor hitch tongue 26 extends forwardly from the forward section F and this hitch may also extend downwardly as shown to hold the front end of the forward section F at a proper elevation with respect to the hitch H of the tractor drawbar pulling the apparatus, for the tractor will assist in supporting this forward section at a proper elevation above the ground. A pair of caster wheels 27 are secured to the frame members 21 near the rear end of the forward section to support the rearward portion of the section. Where a conventional field tractor is used with the operator's seat being positioned almost directly above the tractor hitch H, it will be convenient to provide for a control box 28 mounted upon a post 29 near the apex of the tractor hitch to place this control box within easy reach of the operator. It is contemplated that this control box will include a group of manually operated valves to operate various hydraulic motors and pistons, as will be described, and as such, the control box may be located as shown, or elsewhere if necessary for convenient operation of the apparatus.

The forward section F of the apparatus carries a pickup means P for picking up loose hay as the apparatus is moved across a field and an upright lifting conveyor L for lifting this loose hay upwardly to then drop it into a stack-forming chamber C at the rear section R of the apparatus, as will be described.

The hay pickup means P is essentially a conventional group of components. A transversely disposed drum 30 at the forward end of the pickup means is mounted between support plates 31 below the framework of the forward section F. Radial fingers 32 on this drum 30 pick up loose hay from the ground as the drum rotates and then drop this hay upon a conveyor belt 33. This belt is sectioned to provide clearances for the fingers 32 and extends to a transversely disposed roller 34, which is also mounted between the plates 31 rearwardly and above the drum 30. Loose hay drops from the belt 33 and into a helical conveyor 35 which is adjacent to and lies parallel with the roller 34. This conveyor 35 has opposing flites which move the loose hay inwardly to the center of the apparatus to there be deposited upon a pickup belt 36 of the narrower lifting conveyor L.

This lifting conveyor L consists of the pickup belt 36 and a holding belt 37 which lies against the pickup belt to hold hay in position when the pickup belt moves upwardly. These belts are best illustrated at FIG. 4 and are housed in an upright hood 38 which has a rearward extension 39 overhanging the forward end of the stack chamber C. Loose hay is dropped from this hood, from the pickup belt and into the chamber. The pickup belt 36 and the holding belt 37 extend between and are turned about rollers which are mounted between the opposing sidewalls of the hood 38 and its rearward extension 39. The course of the pickup belt 36 includes a nearly horizontal reach adjacent to the conveyor 35. It then turns upwardly about a drive roll 40 to extend upwardly to the top of the hood 38. Thence, the belt turns about an idle roll 41 to extend rearwardly and into the rearward hood extension 39 to turn about an idle roll 42. Thence the belt extends about idle rolls 43 forwardly, and thence downwardly to the bottom of the hood 38, and thence forwardly and about a forward idle roll 44 below the conveyor 35 to complete the loop.

The holding belt 37 which engages the face of the pickup belt moves in an opposite direction. Commencing where it engages the pickup belt, the holding belt 37 turns about the drive roll 40, with the pickup belt, to extend upwardly to the top of the hood 38. Thence this holding belt also turns about the idle roll 41, with the pickup belt, to extend rearwardly into the rearward hood extension 39, but there, the holding belt diverges from the course of the pickup belt to turn about an upper idle roll 45. Thence, this holding belt extends forwardly and about an idle roll 46, and thence downwardly to the drive roll 40.

The pickup means P and the lifting conveyor means L, as above described, may be operated by a hydraulic motor 47 which is suitably connected with the drive roll 40. Mechanical driving connections interlink this drive roll with the conveyor 35 and with the hay pickup means P so that the entire group may be driven from a common motor. Preferably, this motor 47 will be operated by a suitable control valve at the control box 28. In addition to the operation of the pickup system, a hydraulic cylinder 48 may be connected with the frame of this forward section, as at the tongue as shown at FIG. 4, to raise and lower the pickup means P, the hydraulic cylinder being connected to one of the side plates e1 of the pickup means P.

To complete the forward section F, an upright, reinforced strut 49 upstands from each forward side frame member 21 to hold upper and lower transverse beams 50 which are shown as channels at FIG. 4. These beams assist in supporting the hood 38 and each beam holds a rearwardly extending hydraulic cylinder 51 at each side of the hood 38 and these cylinders support a transverse platen 52 which forms a shiftable front wall of the stack chamber C.

The stack chamber C, formed upon the rearward section R, is formed as a box-like container. The platen 52, defining the front wall of this container, as mentioned, extends between sidewalls 53R and 53L which extend upwardly from the longitudinal rearward frame members 22. The rear wall of this chamber is defined by a pair of outwardly swinging gates 54. Each gate is secured to the rear edge of its adjacent, respective sidewall by hinges 55 and a suitable latch 56 at the center of the gates holds them shut when a stack is being formed within the chamber.

The front wall platen 52 is adapted to be shifted rearwardly and into the forward end of the chamber C by the extension of the pistons of the cylinders 51. Thus, these cylinders will operate in unison to hold the platen vertical and transversely to the longitudinal axis of the unit. A horizontal guide channel 57 is mounted upon the front portion of each sidewall, 53R and 53L, and a lug 58 at each side of the front wall platen 52 rides in an adjacent channel 57 to support the platen above the floor of the channel.

The forward end of the stack chamber C is underneath the rearward extension 39 of the hood and thus, a short section at the forward end of the chamber receives hay dropped from the pickup belt 36. When a sufficient amount of hay is dropped into this forward section of the chamber, the platen 52 is extended rearwardly to push the hay from the forward section and into a rearward section of the chamber C. The rearward section of the chamber is where the stack is formed and this section consitutes the major portion of the chamber. It may be proportioned to provide for a stack of substantial size, depending upon the length of the structure.

A transversely disposed conveyor 59 is located at the floor of the forward section of the stack chamber to extend from an opening 60 in the left side of the sidewall 53L as shown. This conveyor 59 is formed as a conventional conveyor belt extended about a set of rollers. These rollers include an idle end roller 61 located adjacent to the closed right side of the chamber, and it is mounted in suitable bearings in opposing cross frame members 24. A guide roller 62 is located adjacent to the left side opening 60 and it is also mounted in suitable bearings in the opposing cross frame members 24. A drive roller 63 is mounted on pivoted extension arms 64 which may reach outwardly from the left frame member 22 as shown at FIGS. 5 and 12. Suitable slide members 65 may be mounted between the rolls to support the belt. A hydraulic motor 66 is connected to the extended drive roller 63 to dirve the conveyor belt. The purpose of this transverse conveyor is to move hay out of the chamber and to discharge it from the side of the chamber as when filling feeder troughs, forming windrows or the like. When not in use, this extended portion of the conveyor belt on the drive roll 63, which is carried by the arms 64, may be folded upwardly to close the side opening 60.

A longitudinally disposed conveyor 67 is located at the floor of the rearward portion of the chamber C. This longitudinal conveyor 67 is substantially the full width of the chamber and it extends from the edge of the transverse conveyor 59 to the rear end of the chamber. This longitudinal conveyor 67 is a conventional type, and is preferably made as an array of interconnected, articulated transverse slats. It extends about a forward roller 68 and a rearward roller 69. These rollers, which may also be equivalent sprocket assemblies, are mounted in suitable bearings in the opposing longitudinal frame members 22. Supporting slide means 70 are provided in the reach between the forward and rearward rollers 68 and 69. A pair of hydraulic motors 71 are mounted on the left side frame member 22 to connect with the forward roller and the rearward roller 69, to more effectively drive this longitudinal conveyor in either direction. Accordingly, a haystack may be moved out of the chamber C when the gates 54 are open and the longitudinal conveyor 67 is moving rearwardly. Also, by reversing the direction of the conveyor 67, a haystack may move into the chamber C.

To facilitate the movement of a haystack out of and into the chamber C, the rearward section R of the apparatus will tip downwardly about the transverse pivot bar 20 to slope toward the rear of the apparatus, as heretofore mentioned. This rearward section R is supported at its front end by the forward section F through the connection at the pivot 20. The rearward section R is also supported by a pair of wheels 73 at each side of the section, and it is manifest that whenever the rearward section R is tipped about the pivot bar 20, this section must be lowered between the pairs of wheels 73.

Figure 2:
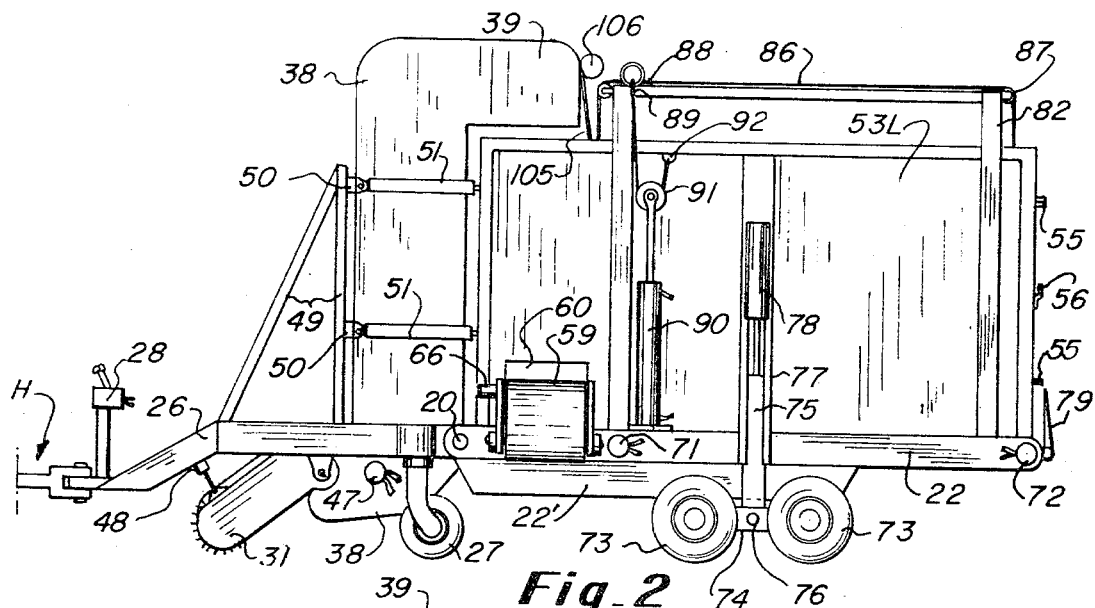
FIG. 2 is a left side elevational view of the apparatus.
Figure 3:
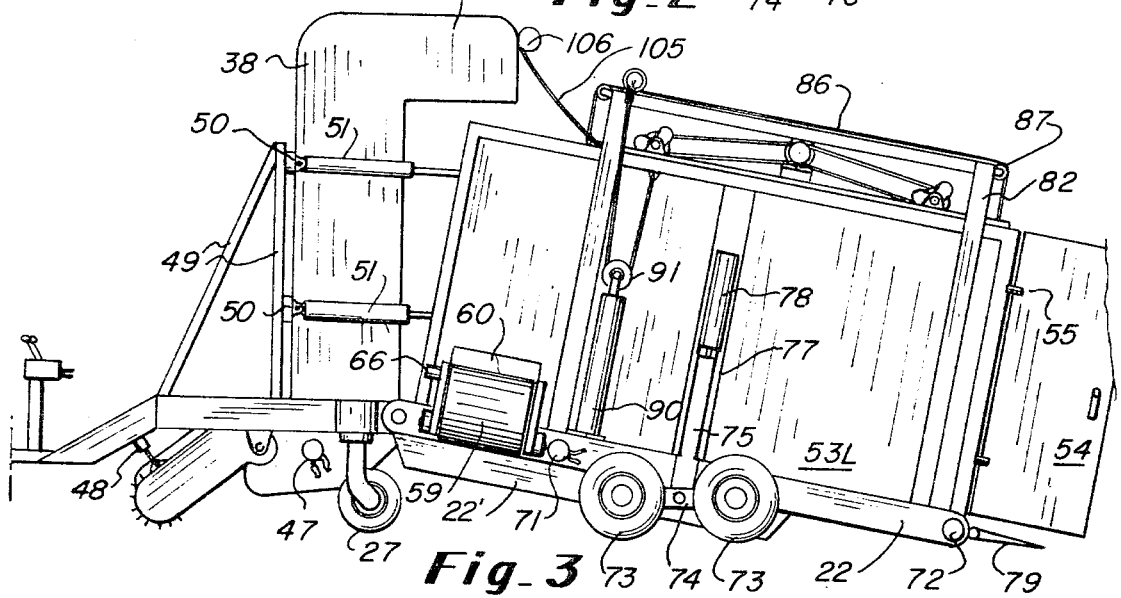
FIG. 3 is a left side elevational view similar to FIG. 2, but with the rearward section of the unit being tipped to facilitate discharging a hay stack from the same.

The two wheels 73 of each pair, at each side of the apparatus, are arranged in tandem and they are mounted upon a common horizontal bar 74. An upstanding post 75 is connected to a pivot 76 at the center of each bar 74 and this post 75 extends upwardly into a channel-shaped slideway 77 mounted upon the respective sidewall 53L and 53R. A hydraulic cylinder 78 is mounted in the upper reach of each slideway 77 and the piston of this cylinder is connected with the upper end of the post 78 in that slideway. Accordingly, when one of the pistons is extended, the wheels at that side are lowered with respect to the rearward section R and the cylinders 78 at each side of the apparatus hold the rearward section upwardly at a proper level as illustrated at FIG. 2. When the pistons are retracted, however, the posts move upwardly into their respective slideways 77 to lower the rearward section as illustrated at FIG. 3. Each cylinder 78, at each side of the apparatus, is connected through a pressure line, not shown, which extends to a common control valve at the control box 28 which operates the cylinders in unison.

To complete this arrangement for tipping the rearward section to better discharge a haystack from the chamber or to pick up a haystack, a swingable tailgate 79 is pivotally mounted upon the rearward corss frame member 24' of the rear section R to be extended to provide a platform, as shown at FIG. 3.

To facilitate the forming of a compact hay stack in the chamber C, a hay shifting and compacting float 80 is provided in the rearward section of the chamber C. This float is carried within a rectangular framework 81 having substantially the same proportions as the longitudinal conveyor 67 and is adapted to overlie this rear longitudinal conveyor. Although some tipping of this float will occur, it is anticipated that in normal operation the framework of the float will remain horizontal and will lie in spaced parallelism with the conveyor 67 which forms the floor of the chamber C. To hold this float 80 in position, and especially to restrain any tendency for it to move forwardly or rearwardly, corner posts 82 are provided in the sidewalls 53L and 53R, a post 82 being located near each corner of the float frame. Each post 82 includes a channel-shaped slideway 83 to receive a wheel 84 carried upon a shaft 85 outstanding from the face of the frame 81, as best illustrated at FIG. 15.

While the float 80 will normally ride upon a haystack being formed underneath it, it may also be lifted to the top of the chamber. To permit this float to clear the chamber, the posts 82 extend a short distance above the top of the sidewalls 53L and 53R as illustrated at FIGS. 2 and 3. A lifting system is diagrammatically set forth at FIG. 11 and may be described with reference to that figure and FIGS. 1, 2 and 4. A cord 86 is secured to each corner of the frame 81 to extend upwardly and pass about a pulley 87 secured to the top of the adjacent post 82. The cords 86 at each side of the chamber C extend longitudinally and come together at a common point which is preferably located at the forward post of the chamber. Thence, the cords turn horizontally about pulleys 88 to extend transversely along a common path and to the left side of the apparatus; thence, the cords turn downwardly about another pulley 89 to extend as a common cord to the piston of a pulling cylinder 90. To multiply the movement of the piston of cylinder 90, the piston carries a pulley 91 about which the cord 86 is wrapped to extend upwardly to an anchor 92 at the top of the wall of the chamber. Accordingly, when the piston is extended upwardly, the float frame is moved downwardly into the chamber, but when the piston is retracted downwardly, the float frame is moved upwardly to the top of the chamber, as best illustrated at FIG. 3.

The float is formed as a longitudinally extended array of closely spaced, articulated, channel-shaped shifting bars 93. These shifting bars 93 are channel-shaped members fitted alongside each other as best shown at FIG. 6, and they are supported upon a pair of identical, transversely disposed crank shafts 94, with one crankshaft extending across the forward section of the float frame 81 and the other extending across the rearward section of the float frame. Each crankshaft is held in position in bearings 95 upstanding from the float frame. Each crankshaft includes crank throws 96 above each shifting bar 93 in a paralleled arrangement with the other crankshaft so that the two move in unison. Thus, each crank throw 96 is attached to a connecting rod 97 upstanding from the respective shifting bar 93. Accordingly, as the crankshafts rotate, a circulatory, reciprocating movement of each shifting bar is effected. A hydraulic motor 98 is mounted on a transverse crossbeam 81 spanning the float frame 81, and transmission belts 99 extend from pulleys 100 on the motor to corresponding pulleys 101 on each crankshaft, as best illustrated at FIG. 6.

The reciprocating, circulatory movement of the shifting bars 93, as indicated by arrows at FIG. 7, effects a downward and rearward thrusting movement at the undersurface of the shifting bars and an upward and forward return movement of the bars. This movement will tend to drag loose hay underneath the float to the rear end of the chamber C. To accentuate this dragging movement, the undersurface of each shifting bar is provided with an array of downwardly extending spikes 102 as best illustrated at FIG. 7. It is contemplated that the spikes 102 near the forward end of each shifting bar will be longer than the spikes near its rearward end to provide for more effective pulling movements near the front end of the float 80 to better fill the rear of the chamber with loose hay.

FIGS. 8, 9 and 10 illustrate an alternate construction of a shifting bar by providing, in lieu of the spikes 102, an array of stepped blocks 103 which form a serrated pattern, as best illustrated at FIG. 8. Preferably, these blocks decrease in size towards the rear end of the float.

It is contemplated that reverse movements of these shifting bars will sometimes be desired to push hay forwardly instead of rearwardly. Where the spikes 102 are used, it is necessary to merely reverse the rotation of the crankshafts 94. However, where the blocks 103 are used, it is also necessary to reverse the blocks in some manner. To provide for this, each block is connected to its shifting bar 93 by a spring loaded bolt 104, as illustrated at FIG. 9. Reversing a serrated block then consists in the simple operation of manually changing its direction as indicated at FIG. 10.

When loose hay is discharged from the pickup belt 36 into the chamber C, there is always a chance that some of the hay will be misdirected forwardly or rearwardly. When hay is misdirected forwardly, it will strike the platen 52 forming the front wall of the chamber. To prevent hay from being thrown rearwardly and onto the top of the float 80, a transverse curtain 105, mounted in a spring loaded roller 106, is connected to the rear end of the hood extension 39 and this curtain 105 is extended from its roller downwardly to connect with the forward edge of the float frame 81 as at 107. Accordingly, as the float is lowered, the curtain 105 is extended to protect the mechanisms mounted upon the top of the float from being clogged with loose hay and to direct the loose hay to the floor of the chamber.

The hydraulic system for the apparatus is illustrated diagrammatically at FIG. 16. A suitable pump 110 is powered from the tractor motor or by any other suitable power source to receive fluid from a reservoir 111 and to pipe the same into a manifold 112 connecting with an array of valves 113 which are manual control valves for the apparatus which may be located at the control 38. These valves are four-way valves which connect to a discharge manifold 114 which returns to the reservoir. Two hydraulic lines 115 will extend from each valve to a cylinder or to a motor of the organization heretofore described.

The controls may be described with reference to the operation of the unit. As the apparatus is moved across a field of cut, loose hay, the pickup means are adjusted to ground level by the cylinder 48, and operation of the motor 47 effects a pick up of hay and movement of the hay to the forward end of the chamber C. There, as a pile of hay is accummulated, the float is operated by operation of motor 98 to shift the hay rearwardly underneath the float. As the hay fills the chamber C to form a stack, the float is moved upwardly by retraction of the cylinder 90. When the chamber is filled, the apparatus is moved to a location where the hay stack in the chamber may be discharged. This involves the opening of the rear gates 54, the lowering of the rear section of the trailer by retracting the pistons of cylinders 78 and then lowering the tailgate 79. Next, the longitudinal conveyor 67 is started by operating the motors 71 and 72 to move the stack out of the chamber. The platen 52 will be extended during this operation to assist in the unloading operation and to better compress the stack onto the longitudinal conveyor.

When it is desirable to pick up a stack with this apparatus, the apparatus is tipped, the tailgate lowered and the apparatus then backed into a haystack. As it moves into the haystack, the longitudinal conveyor is reversed in its movement and the channels of the float are likewise reversed to literally pull the stack into the chamber. When it is desirable to discharge hay from the side of the apparatus, the transverse conveyor 59 is used. It is operated by a motor 66. At the same time, the longitudinal conveyor 67 moves a stack within the chamber forwardly and onto the conveyor 59.

I have now described my invention in considerable detail. However, it is obvious that others skilled in the art can build and devise alternate and equivalent constructions which are nevertheless within the spirit and scope of my invention. Hence, I desire that my protection be limited, not by the constructions illustrated and described, but only by the proper scope of the appended claims.

I claim:

1. An apparatus for picking up loose hay and compacting the same into a stack for subsequent discharge from the apparatus, and comprising, in combination with a vehicle means carrying the apparatus:
    a. a pickup means extended transversely across the vehicle means with respect to the direction of movement of the vehicle means, to pick up a swath of loose hay lying in a field as the vehicle means moves across the field;
    b. a box-like, open-top chamber, formed as a walled enclosure, including side walls upstanding about a floor, carried upon the vehicle and proportional to permit a haystack to be formed within it;
    c. a conveying means associated with the pickup means adapted to receive hay from the pickup means and to drop the same into one end of the chamber; and
    d. a float overlying and being carried above the floor of the chamber, including a hay shifting means adapted to move hay underneath the float as it is dropped into the chamber, whereby the float will ride upon a haystack being formed in the chamber.

2. The apparatus defined in claim 1, wherein:
the pickup means and the conveying means are forwardly of the chamber with respect to the direction of movement of the vehicle means, and thus drop hay into the forward end of the chamber;
the forward edge of the float is spaced from the forward wall of the chamber a distance sufficient to permit the hay to fall past the float and to the floor of the chamber; and
a gate means at the rear of the chamber opens to release a stack formed in the chamber.

3. The apparatus defined in claim 2, wherein:
a rearwardly directed conveyor means forms the floor of the chamber to facilitate movement of a haystack from the chamber when the gate means are open.

4. The apparatus defined in claim 2, wherein:
said float shifting means is movable to provide a basic rearward movement to move hay from the forward end of the chamber and to form a stack under the float.

5. The apparatus defined in claim 4, wherein:
said float includes a frame about said shifting means adjacent to the side walls of the chamber, vertical guide means on the side walls of the chamber; means on the frame engaging in the guide means to hold the float in position; and
means to lift the float above the floor of the chamber and hold the same in approximate spaced parallelism with the floor of the chamber.

6. The apparatus defined in claim 4, wherein the float shifting means includes:
longitudinally extended shifting bars arranged as an array across the float and between side frame members; and
reciprocating means carried upon the frame members to longitudinally reciprocate these shifting bars in a sequential, alternating pattern.

7. The apparatus defined in claim 6, wherein:
said reciprocating means is adapted to lower each shifting bar when it moves rearwardly and to raise the shifting bar when it moves forwardly.

8. The apparatus defined in claim 6, wherein said reciprocating means includes:
a transverse crankshaft having a crank throw connecting with each shifting bar.

9. In the apparatus defined in claim 6, including:
gripper means underneath each shifting bar adapted to facilitate the gripping of loose hay dropped into the chamber to move the same rearwardly.

10. In the apparatus defined in claim 4, including:
a shiftable wall section at the front of the chamber movable into the chamber to thrust against a haystack therein and thereby initiate rearward movement of the haystack from the chamber.

* * * * *